May 19, 1931.  C. S. JOHNSON  1,805,769
PORTABLE BATCHER
Filed July 23, 1930   2 Sheets-Sheet 1
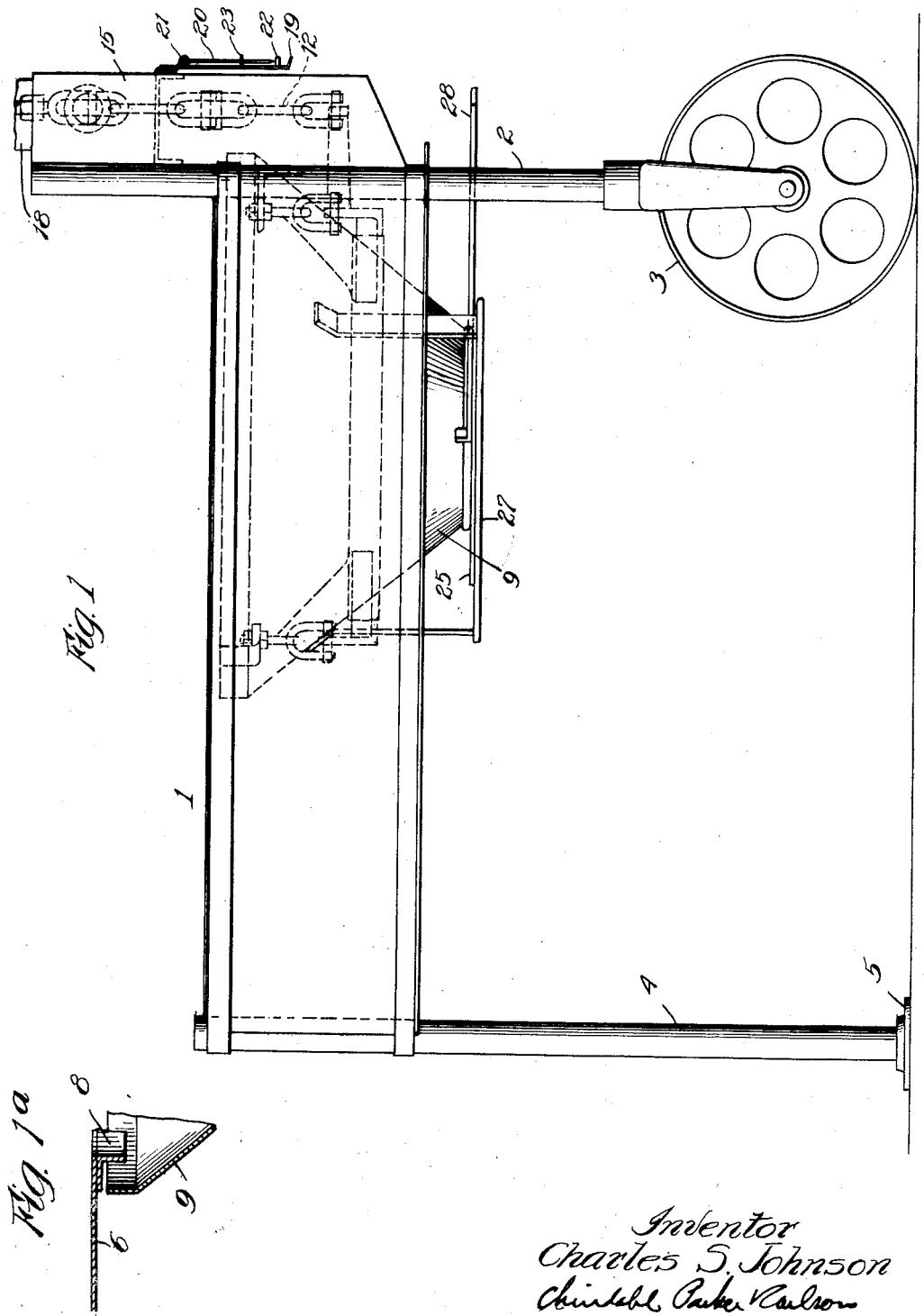
Inventor
Charles S. Johnson May 19, 1931.  C. S. JOHNSON  1,805,769
PORTABLE BATCHER
Filed July 23, 1930   2 Sheets-Sheet 2
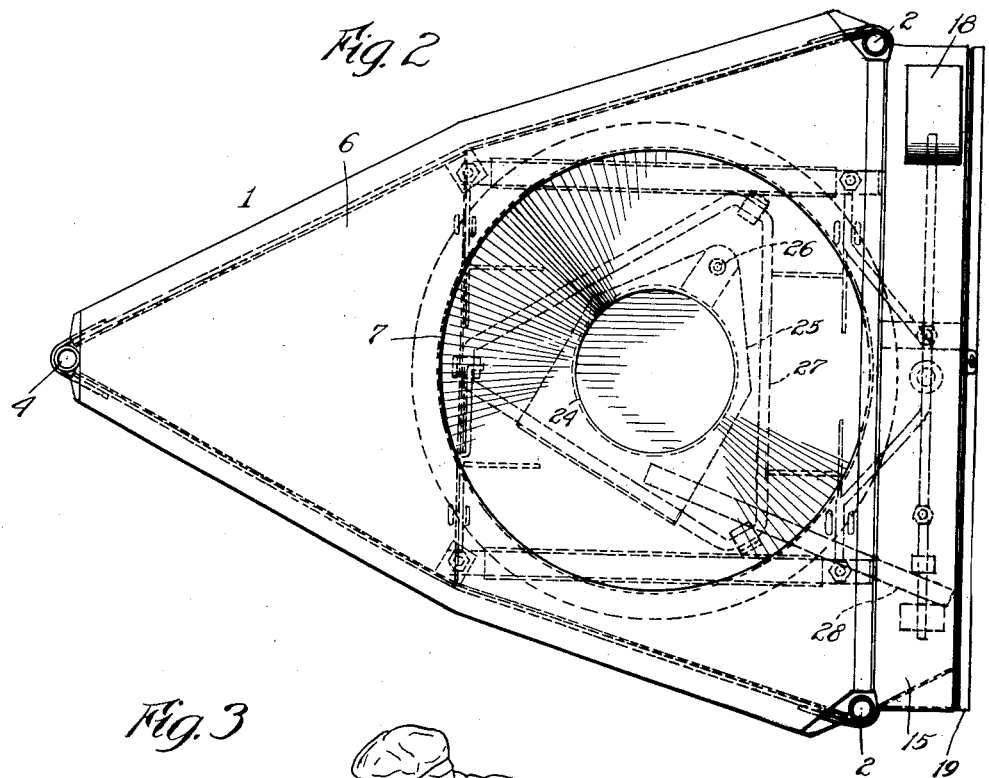
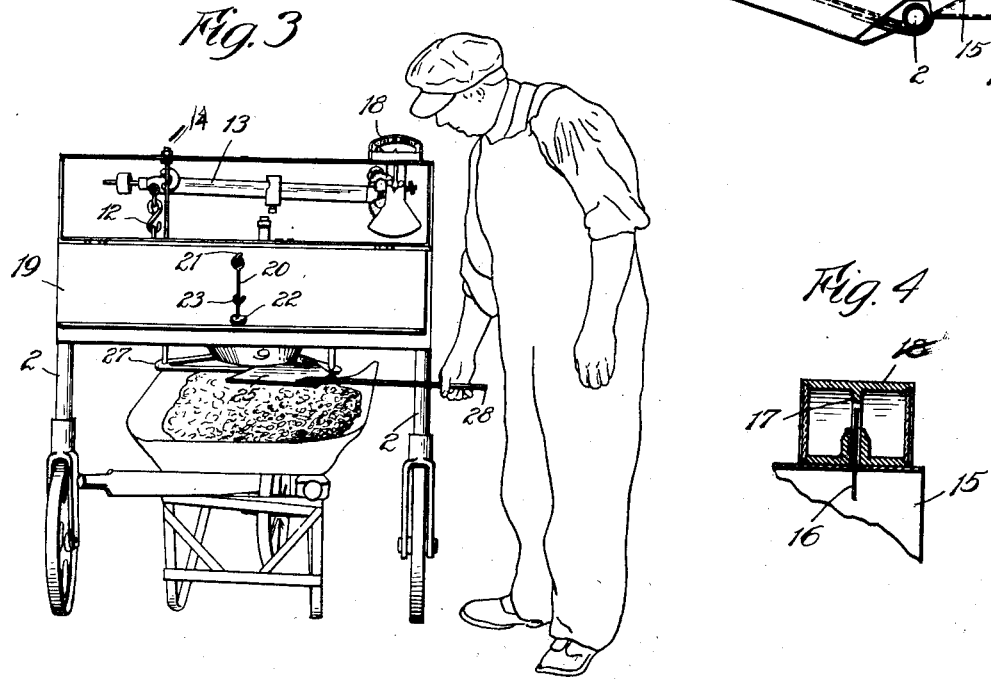
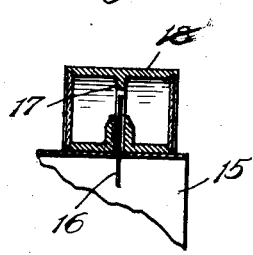
Inventor
Charles S. Johnson Patented May 19, 1931

1,805,769

UNITED STATES PATENT OFFICE

CHARLES S. JOHNSON, OF CHAMPAIGN, ILLINOIS

POBTABLE BATCHER

Application filed July 23, 1930. Serial No. 470,003.

On large concrete construction jobs it is usual to provide a large overhead bin to contain sand, gravel or other aggregates, together with a hopper supported below the bin in position to receive a charge of aggregates, said hopper being employed to measure the batch of aggregates by the volumetric or the gravimetric method. On comparatively small jobs, as, for example, those involving the construction of culverts, small bridges, curbs, gutters, etc., the expense of providing and erecting an overhead bin and batcher is prohibitive, consequently it is the usual practice to dump the aggregates on the ground and prepare batches by shoveling the aggregates from the pile on the ground into a wheelbarrow, the wheelbarrow being commonly employed to measure the batch by volume. This method of preparing batches of aggregates is subject to serious inaccuracies.

The present invention relates to the provision of a batching apparatus which shall be sufficiently inexpensive and so readily portable that it shall be well adapted for use on relatively small concrete construction jobs; which shall be sufficiently low so that the laborer can shovel aggregates into the hopper without excessive effort; which shall permit of weighing each batch; and which shall be so proportioned that a wheelbarrow may be conveniently positioned beneath the hopper to receive the batch.

In the accompanying drawings:

Figure 1 is a side elevation of a batcher embodying the features of my invention.

Fig. 1ª is a fragmental sectional view.

Fig. 2 is a plan view thereof.

Fig. 3 is a perspective view showing the method of use.

Fig. 4 is a detail view of the scale dial.

The embodiment herein shown of the invention comprises a rigid framework 1 which, as viewed in top plan, is of approximately triangular form. The framework 1 is supported upon three legs located at the angles of the framework, the two legs 2 at the front side of the framework being provided with supporting wheels 3 and the rear leg 4 having a foot 5. The upper side of the framework 1 is covered by a plate 6 having a circular opening 7 therein. The opening 7 is defined by a downwardly extending annular flange 8 (Fig. 1ª).

A hopper 9 of generally frusto-conical form is supported within the framework 1 with the larger upper end of the hopper near the top plate 6 and surrounding and spaced away from the annular flange 8. The hopper is supported so as to constitute the scale pan of a weighing scale. It may be supported in the conventional or any preferred manner, and may be connected by means including a chain 12 to a scale beam 13 which is pivotally suported at 14 within a scale casing 15. The casing 15 is secured to the forward side of the framework 1 above the plane of the plate 6 and thus is at a convenient height for manual adjustment of the weighing mechanism. The scale beam 13 is connected to a pointer 16 which is arranged to swing past an arcuate dial 17, the dial being enclosed within a housing 18 which is glazed on opposite sides so that the position of the pointer may be noted from either the front or the rear side of the apparatus. Said housing is located upon one end of the casing 15, and thus is at a convenient height for noting the weight indication.

Preferably, the front side of the scale casing 15 is arranged to be closed by means of a cover 19 which is pivoted to swing on a horizontal axis into the open position shown in Figs. 1 and 3.

For convenience in setting the batcher in horizontal position, I provide suitable means, as, for example, a pendulum 20 pivoted at 21 to the normally inner side of the cover 19, the lower end of said pendulum being arranged to swing above a part 22 having a mark thereon to indicate the horizontal position of the batcher. The pendulum 20 hangs freely within a confining eye 23.

In the lower end of the hopper is a circular discharge opening 24. This opening is arranged to be closed by means of a horizontal gate 25 which is pivoted at 26. The end of the gate opposite to the pivoted end is slidably supported upon a triangular frame 27 which is attached to the hopper. Rigid with the gate 25 is a handle 28 that extends toward the front of the batcher into position to be conveniently operated by a workman standing at or near the front of the machine, as indicated in Fig. 3. In all positions of the gate, the free end thereof is supported upon the triangular frame 27 against the pressure of the material resting on the gate.

The batcher is of such height that a workman shall be able to shovel material from off the ground and into the hopper with minimum effort, a height of forty-two inches to the top plate 6 being a convenient height. Since the hopper is intended to discharge into a wheelbarrow of the usual capacity, it is preferably made to hold four cubic feet or four hundred pounds of aggregates. There is sufficient clearance, as, for example, twenty-six inches, under the hopper to accommodate a standard wheelbarrow. The distance between the legs 2 is sufficient so that a wheelbarrow may be slid therebetween, so as to position the center of the wheelbarrow under the discharge opening 24. When thus positioned, the handles of the wheelbarrow project sufficiently beyond the batcher to points where they can be conveniently grasped by the workman.

In use, the batcher is caused to stand level by shoveling a little sand or gravel under one of the legs 2 and 4. The gate 25 being in closed position, the workman slides a wheelbarrow between the legs 2 and proceeds to shovel aggregates into the hopper. As the hopper is being filled, the workman glances at the pointer 16 so as to know when the correct weight of material has been placed in the hopper. The gate 25 is then opened to allow the contents of the hopper to drop into the wheelbarrow.

It will be seen that the batcher is so light that it may be readily moved forward as the stock pile recedes due to consumption of material so as always to be within convenient distance from the point from which the workman is shoveling. It is sufficiently light so that two men can easily place it upon or remove it from a motor truck or other vehicle of transportation. The use of three supporting legs facilitates leveling and obviates the torsional stresses that would arise in the use of four supports.

I claim as my invention:

1. A portable batcher for weighing a batch and discharging it into a wheelbarrow, comprising a supporting frame, legs upon which said frame is mounted for convenient movement and leveling and between two of which a wheelbarrow may be slid with the handles of the wheelbarrow projecting beyond one end of said frame, a hopper suspended in said frame in position to be directly above the center of a wheelbarrow inserted between said legs, a weighing scale mechanism connected to said hopper and mounted upon that end of said frame beyond which the handles of the wheelbarrow project, a gate for controlling the discharge from the hopper, and a handle for operating said gate, said handle projecting through the space between said two legs.

2. A portable batcher for weighing a batch and discharging it into a wheelbarrow, comprising a supporting frame, legs upon which said frame is mounted for convenient movement and leveling and between two of which a wheelbarrow may be slid with the handles of the wheelbarrow projecting beyond one end of said frame, a hopper suspended in said frame in position to discharge into a wheelbarrow inserted between said legs, a weighing scale mechanism connected to said hopper and mounted upon said frame, a pivoted horizontally movable gate for controlling the discharge from the hopper, and a support upon which the free end of the gate rests in all positions of the gate.

3. A portable batcher for weighing a batch and discharging it into a wheelbarrow, comprising a supporting frame, legs upon which the frame is mounted for convenient movement and leveling and between two of which a wheelbarrow may be slid, a plate closing the upper side of said frame and having an opening into which material may be shoveled, a hopper suspended in said frame directly below said opening and above the center of a wheelbarrow inserted between said legs, a scale casing located at one end of said frame and projecting above the plane of said plate, and weighing mechanism in said casing and connected to said hopper.

4. A portable batcher comprising a supporting frame, legs upon which said frame is mounted for convenient movement and leveling, a hopper suspended in said framework, and a weighing scale mechanism connected to said hopper and mounted upon one end of said framework, said mechanism including a dial, a pointer, and a housing for said dial and pointer, said housing being glazed on opposite sides and being located above the remainder of the batcher.

5. A portable batcher comprising a triangular supporting frame, three legs, one at each angle of the frame, upon which said frame is mounted for convenient movement and leveling, a hopper suspended in said frame, a weighing scale mechanism connected to said hopper and mounted upon one end of said frame, and means at said end of the frame for controlling the discharge from the hopper.

In testimony whereof, I have hereunto affixed my signature.

CHARLES S. JOHNSON.